United States Patent [19]

Gaebele

[11] 3,783,190

[45] Jan. 1, 1974

[54] APERTURE CORRECTION CIRCUIT FOR LOW LIGHT LEVEL TELEVISION CAMERA

[75] Inventor: Rolf Gaebele, Redwood City, Calif.

[73] Assignee: GTE Sylvania Incorporated, Mountain View, Calif.

[22] Filed: Apr. 8, 1971

[21] Appl. No.: 132,443

[52] U.S. Cl. .......................... 178/7.2, 178/DIG. 25

[51] Int. Cl. .......................... H04n 5/14

[58] Field of Search .............. 178/7.1, 7.2, DIG. 25, 178/DIG. 29

[56] References Cited

UNITED STATES PATENTS 2,961,574 11/1960 Brenholdt .................. 178/DIG. 29

OTHER PUBLICATIONS

McMann, Jr. et al., "Improved Signal Processing Techniques For Color Television Broadcasting," Journal of the SMPTE, Vol. 77, Copyright 1968, Pages 221–228.

*Primary Examiner*—Richard Murray
*Attorney*—Norman J. O'Malley, John F. Lawler and E. J. Nealon

[57] ABSTRACT

An aperture correction circuit for a low light level television (LLLTV) camera comprises a transistor differential amplifier having a delay line connected between the transistor base electrodes and a voltage controlled variable resistor, such as a Raysistor, connected between the emitter electrodes of the transistors. The control voltage for the Raysistor is derived from the video signal amplitude or the target control voltage as a measure of the average value of the intensity of light from a viewed scene. The control signal may be obtained from a threshold circuit or from the automatic light control circuit.

5 Claims, 3 Drawing Figures

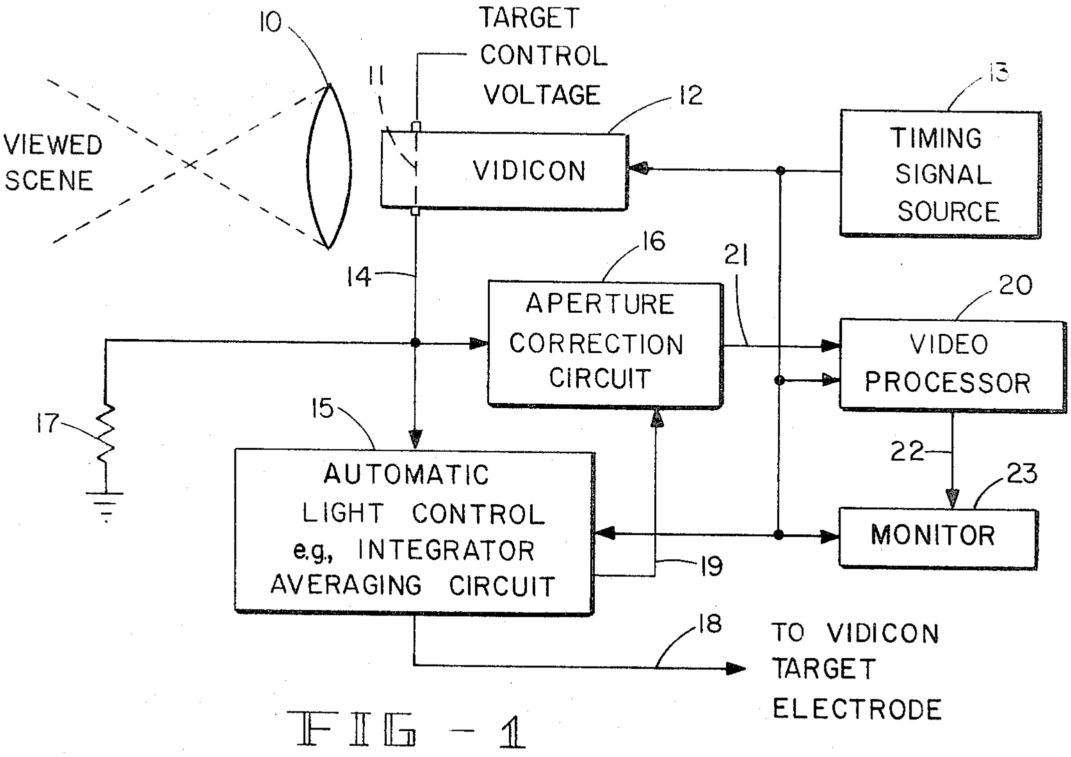
FIG - 1
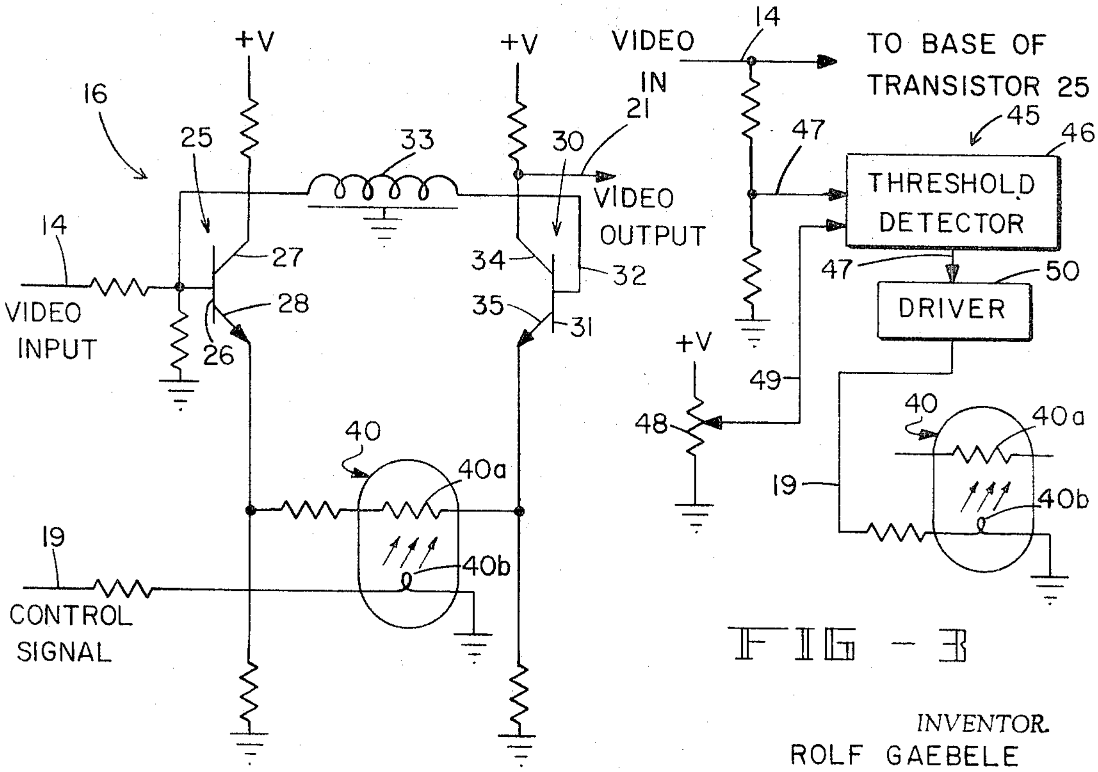
FIG - 3
FIG - 2
INVENTOR.
ROLF GAEBELE
BY John F. Lawler
ATTORNEY

APERTURE CORRECTION CIRCUIT FOR LOW LIGHT LEVEL TELEVISION CAMERA

BACKGROUND OF INVENTION

This invention relates to low light level television cameras and more particularly to an aperture correction circuit therefor.

In low light level television cameras, light from a viewed scene is focused onto a camera pick-up tube to produce a charge image of the scene on a target of the tube. The charge image is sequentially scanned with an electron beam to produce a video output signal having an amplitude that varies in time as a function of the intensity of light from the viewed scene. It is desirable that the size of the electron beam be infinitesimally small so that the waveform of the output signals shall be as sharp and square as possible, resulting in the a video signal that is an accurate reproduction of the charge image. Some of this fine detail, i.e., high frequency, is lost, however, due to the finite size of the scanning spot and the essentially Gaussian charge distribution across it, thereby causing a distorted or "smeared" reproduction of the charge image.

A conventional aperture correction circuit compensates for this distortion by boosting the amplitudes of high frequency components of the video signal in such a way as to sharpen the corners of the waveforms. In other words, by this technique the response time of the scanning electron beam to a change in the intensity of the charge image on the camera tube target plate is improved so as to make the electron beam appear to have a charge distribution with very short or sharp rise and fall times. Such a circuit is described in an article entitled "Horizontal Aperture Equalization" by A. N. Thiele, in *The Radio and Electronic Engineer*, Vol. 40, No. 4, page 193, Oct. 1970. Noise current in the camera pick-up tube or vidicon, however, is mainly comprised of high frequency components which may be larger than the video signal for a charge image produced by low light levels in a viewed scene, i.e., images illuminated by starlight or moonlight. Compensation provided by the conventional aperture correction circuits for such low light level scenes boosts the noise signals to such a degree that the video signal is seriously degraded or obscured.

An object of this invention is the provision of an aperture correction circuit which overcomes this deficiency in low light level television cameras.

SUMMARY OF INVENTION

In accordance with this invention, the amount of boost or amplification of high frequency components in the video signal by the aperture correction circuit of an LLLTV camera is automatically controlled as function of the average intensity of light from the scene viewed by the camera. Such compensating amplification is therefore automatically diminished when the average light level of a viewed scene drops so that noise signals are not boosted in weak or low video signal environments.

DESCRIPTION OF FIGURES

FIG. 1 is a schematic block diagram of an LLLTV camera embodying this invention;

FIG. 2 is a circuit diagram of an aperture correction circuit embodying this invention; and FIG. 3 is a schematic circuit and block diagram of a modified form of control signal processor for the aperture correction circuit.

DESCRIPTION OF PREFERRED EMBODIMENTS

Referring now to the drawings, FIG. 1 illustrates a low light level television camera having an input lens 10 which focuses the image of the viewed scene on the target electrode 11 of a vidicon 12 to which the output of timing signal source 13 is fed. The video signal output of vidicon 12 on line 14 is applied through a preamplifier, not shown, to an automatic light control (ALC) circuit 15 and an aperture correction circuit 16 across load resistor 17. The output of the ALC circuit on line 18 is applied to the vidicon target electrode 11 and changes its bias voltage and thus the gain of the vidicon in proportion to the light level of the viewed image. The ALC circuit output is also applied on line 19 to an aperture correction circuit 16 as explained in greater detail below. A video processor 20 receives the output of the aperture correction circuit on line 21 and provides the video signals on line 22 to monitor 23 for reproduction of the viewed scene. FIG. 1 is a very simplified representation of the circuits with which the present invention is associated and is not intended to include all details of such circuits. For example, image intensifiers normally associated with the circuit are omitted for sake of simplicity and clarity. Such details are included in the description of an automatic light control circuit in a copending application, Ser. No. 118,660, assigned to the assignee of this application.

Referring now to FIG. 2, aperture correction circuit 16 comprises a differential amplifier having a first transistor 25 with a base electrode 26, a collector electrode 27 connected to voltage source V and an emitter electrode 28. The second transistor 30 of the differential amplifier has its base electrode 31 connected by line 32 through a delay circuit 33 to the video input line 14 in parallel with the base electrode 26 of transistor 25. Transistor 30 has a collector electrode 34 connected to video output line 21 and to voltage source V and also has an emitter electrode 35.

Emitter electrodes 28 and 35 of transistors 25 and 30, respectively, are interconnected by a resistance element **40*a* of variable resistor component 40. The resistance of resistor 40*a* is variable and depends upon the amount of light emitted by lamp element 40*b* of component 40. Power for illuminating lamp element 40*b* is derived from the ALC circuit output on line 19 and therefore is proportional to the light level or brightness of the image on the vidicon target electrode 11. More specifically, component 40 is responsive to control signals on line 19 resulting from normal or high ambient light levels for decreasing the resistance of resistor 40*a*. Conversely, low light levels in viewed scenes cause the control signal on line 19 and element 40*b* to increase the resistance of resistor 40*a*. Component 40** is sold commercially, one type being marketed under the trademark Raysistor by Raytheon Company.

In operation, a video input signal on line 14 is passed from the base of transistor 25 to emitter electrode 28 and through variable resistor **40*a* to emitter 35 of transistor 30. At the same time, the input signal is passed through delay circuit 33 and line 32 to the base of transistor 30 and is reflected backthrough the delay circuit to the input of transistor 25. The delay produced by circuit 33 is predetermined to coincide with the width of the pulses to be compensated or sharpened as is well known in the art and explained in detail in publication described above. When the light level of the viewed scene is high, resistance of resistor 40a is low and the amplified output of transistor 25 at emitter 28 is effectively transmitted to and further amplified by transistor 30 for transmission to the video processor on line 21. When the light level of the scene is low, the control signal on line 19 causes the resistance of resistor 40a to become high, thus attenuating or blocking the signal output at emitter 28. This results in reduction of the amplitude of the high frequency components in the output signal on line 21** in proportion to the ambient light level. In this manner, the aperture correction circuit is effectively neutralized under conditions when its operation would otherwise detract from performance of the system.

In the foregoing description of FIGS. 1 and 2, the control signal for operating variable resistor component 40 is derived from ALC circuit 15 since the latter is responsive to ambient light level for producing amplification control signals. An alternate source of this aperture correction circuit control signal is a processor circuit 45 shown in FIG. 3 which may be contained in aperture correction circuit 16 as a part thereof. Processor 45 comprises a threshold detector 46 connected by line 47 to the video input line 14. The threshold level of detector 46 is determined by the setting of a potentiometer 48 connected by line 49 to the detector. The output of detector 46 on line 47 is connected to a driver circuit 50 consisting of an amplifier which produces an output current signal on line 19 for energizing the filament 40b of variable resistor component 40. Line 14 and component 40 are also connected to transistors 25 and 30 of the differential amplifier as shown in FIG. 2, these parts being omitted from FIG. 3 for clarity of illustration.

Processor 45 is responsive to the magnitude of the video signal as a measure of the brightness or light level of the viewed scene for producing a control signal on line 19 when the video level exceeds the predetermined threshold level set by potentiometer 48. In a low light level environment in which the input to detector 46 is below its predetermined threshold level, the output of driver 50 on line 19 is zero and the resulting high resistance of resistor 40a essentially disables the aperture correction circuit. Conversely, when the amplitude of the video signal is high, the aperture correction circuit is operative to boost the high frequency components of the signal for sharpening the waveforms.

I claim:

1. In a low light level television system having a vidicon with a target plate responsive to the level of light in the ambient scene being viewed and producing output video signals, an aperture correction circuit with first and second transistor amplifiers having base electrodes interconnected by a delay line, means for applying the video signal from the vidicon to the base electrode of the first transistor, and a video output line connected to the collector electrode of said second transistor amplifier, the improvement consisting of a variable resistor interconnecting the emitters of said transistor amplifiers, and means responsive to the ambient light level of said viewed scene for changing the resistance of said variable resistor whereby automatically to disable the aperture correction circuit in low ambient light levels.

2. The system according to claim 1 with an automatic light control circuit connected to the video output of said viicon and having an output, said last named means comprising at least part of said output of the automatic light control circuit.

3. The system according to claim 1 in which said last named means comprises a threshold detector having an input connected to the video output of said vidicon and producing an output when said input thereof exceeds, a predetermined threshold level, means for adjusting the threshold level of said detector, and means responsive to the output of said detector for changing the value of said variable resistor.

4. The system according to claim 2 in which said variable resistor is responsive to light for changing the value of its resistance, a light emitting element adjacent to said resistor, said element being electrically connected to the output of said automatic light control circuit.

5. The system according to claim 3 in which said variable resistor is responsive to light for changing the value of its re-sistance, a light emitting element adjacent to said resistor, said light emitting element being responsive to the output of said threshold detector for generating light incident on said resistor.

* * * * *